US010228702B2

United States Patent
Demortier et al.

(10) Patent No.: US 10,228,702 B2
(45) Date of Patent: Mar. 12, 2019

(54) METHOD FOR OPTIMIZING THE TAKE-OFF PARAMETERS OF AN AIRCRAFT

(71) Applicant: Airbus Operations SAS, Toulouse (FR)

(72) Inventors: Jean-Pierre Demortier, Maurens (FR); Eric Petit, Toulouse (FR); Christophe Homehr, Toulouse (FR); Cyrille Thiers, Seilh (FR); Colin Hodges, Tournefeuille (FR); Christian Lulla, Bremen (DE)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/609,090

(22) Filed: May 31, 2017

(65) Prior Publication Data
US 2017/0351269 A1 Dec. 7, 2017

(30) Foreign Application Priority Data

Jun. 3, 2016 (FR) ...................................... 16 55093

(51) Int. Cl.
*G05D 1/06* (2006.01)
*B64C 13/16* (2006.01)
(Continued)

(52) U.S. Cl.
CPC ........... *G05D 1/0661* (2013.01); *B64C 13/00* (2013.01); *B64C 13/16* (2013.01); *B64C 13/18* (2013.01); *G05D 1/0088* (2013.01)

(58) Field of Classification Search
CPC .............................. G05D 1/0661; B64C 13/00
See application file for complete search history.

(56) References Cited

U.S. PATENT DOCUMENTS 3,645,479 A * 2/1972 Kostroun ................ B64C 25/36
137/72
6,154,693 A * 11/2000 Aberschitz ............ G01S 5/0054
701/120
(Continued)

FOREIGN PATENT DOCUMENTS

EP 1586969 10/2005
EP 1684144 7/2006
(Continued)

OTHER PUBLICATIONS

French Search Report, dated Feb. 10, 2017, priority document.

*Primary Examiner* — Alex C Dunn
(74) *Attorney, Agent, or Firm* — Greer, Burns & Crain, Ltd.

(57) ABSTRACT

A method for optimizing the take-off parameters of an aircraft. The aircraft comprises a system for automatically controlling the high lift devices at the moment when the wheels of the aircraft leave the ground. The method comprises a step of selecting a first configuration of the high lift devices at the start of the take-off phase and a selection of an acceleration speed of the aircraft. The method is advantageous in that, on reception of an actual aircraft take-off detection signal, a control unit is configured to transmit a control command making it possible to bring the high lift devices into a second configuration, in which they are retracted relative to the first position, and consecutively accelerate the speed of the aircraft automatically to an acceleration speed entered by the pilot.

8 Claims, 2 Drawing Sheets

(51) Int. Cl.
*B64C 13/00* (2006.01)
*G05D 1/00* (2006.01)
*B64C 13/18* (2006.01)

(56) References Cited

U.S. PATENT DOCUMENTS

| | | | | |
|---|---|---|---|---|
| 7,364,121 | B2* | 4/2008 | Firuz | G05D 1/0083 244/175 |
| 7,835,829 | B2* | 11/2010 | Villaume | G05D 1/0661 244/183 |
| 8,175,763 | B2* | 5/2012 | Yamane | G05D 1/0653 244/180 |
| 8,255,098 | B2* | 8/2012 | Jones | B64C 13/18 244/76 R |
| 2002/0099479 | A1 | 7/2002 | Chatrenet et al. | |
| 2005/0230545 | A1* | 10/2005 | Ayoub | B64D 25/10 244/122 A |
| 2005/0230564 | A1 | 10/2005 | Yamane | |
| 2006/0049308 | A1* | 3/2006 | Good | B64C 3/50 244/76 A |
| 2007/0124034 | A1 | 5/2007 | Pitard et al. | |
| 2007/0185628 | A1* | 8/2007 | Delaplace | G05D 1/0066 701/4 |
| 2010/0222946 | A1 | 9/2010 | Sauvinet | |
| 2011/0208400 | A1* | 8/2011 | Lickfold | F02C 9/32 701/100 |
| 2015/0105945 | A1* | 4/2015 | Moser | B64C 13/04 701/3 |
| 2015/0239550 | A1* | 8/2015 | Berens | B64C 13/16 244/76 A |
| 2016/0086396 | A1* | 3/2016 | Nutaro | G07C 5/0808 701/29.4 |

FOREIGN PATENT DOCUMENTS

FR 2817535 6/2002
FR 2894045 6/2007

* cited by examiner

METHOD FOR OPTIMIZING THE TAKE-OFF PARAMETERS OF AN AIRCRAFT

CROSS-REFERENCES TO RELATED APPLICATIONS

This application claims the benefit of the French patent application No. 1655093 filed on Jun. 3, 2016, the entire disclosures of which are incorporated herein by way of reference.

BACKGROUND OF THE INVENTION

The present invention relates to a method for optimizing the take-off parameters of an aircraft and, in particular, a system for automatically controlling the high lift devices of an aircraft during take-off.

Such a control system for the high lift devices (namely slats and/or flaps) of the aircraft comprising actuation means for moving the high lift devices, a control unit for controlling the actuation means and a means for detecting the actual take-off of the aircraft, corresponding to the moment when the wheels of the aircraft leave the ground, are already known from the patent document FR2817535. At the start of the take-off phase, the high lift devices are brought into a first position in which they are deployed and the control unit is configured so as to generate, at least when the means signals the actual take-off, a control command making it possible to bring the high lift devices into a second position in which they are retracted relative to the first position.

With such a system, during the take-off phase: as long as the aircraft is rolling on the ground, the high lift devices are deployed so as to increase the lift of the aircraft, which has the effect of reducing the take-off speeds and therefore reducing the runway length necessary for the take-off. Consequently, for a given type of aircraft, notably a civilian transport airplane, equipped with such a control system, it is possible to either increase its weight, or use a shorter take-off runway, by comparison to an aircraft of the same type not provided with the control system; and when the actual take-off takes place, that is to say when the wheels of the aircraft leave the ground, the high lift devices are brought into a less deployed position (that is to say with less high lift) so as to reduce the drag, which makes it possible to then obtain an increased climb slope (considering a possible failure of an engine) allowing for a take-off in complete safety.

Although such a system is satisfactory and makes it possible to reduce the take-off length, the aim of the present invention is to enhance this system in order to increase the weight that can take off and consequently the degree to which the aircraft may be filled.

SUMMARY OF THE INVENTION

The subject of the present invention is a method for optimizing the take-off parameters of an aircraft comprising high lift devices and a system for automatically controlling the high lift devices comprising a control lever for moving the high lift devices, a control unit for controlling the retraction of the high lift devices, a human-machine interface provided with a display screen and an input interface, a sensor for detecting the retraction of the landing gears, devices for measuring the speed of the aircraft, and an automatic control system, the method comprising a step of selecting a first configuration of the high lift devices at the start of the take-off phase, characterized in that the method further comprises the following steps:

selecting an objective acceleration speed of the aircraft on the human-machine interface higher than the 35-foot (altitude) passage speed, positioning the control lever on the position of the first configuration of the high lift devices at the start of the take-off phase, activating the automatic control system, and in that, on reception by the control unit of an actual aircraft take-off detection signal, from the reception of a landing gear retraction signal and a confirmation of the actual speed of the aircraft higher than a minimum set point speed of a second configuration as being the next configuration in a list of the set points known by the unit, the unit is configured to transmit a control command making it possible to bring the high lift devices into this second configuration, in which the high lift devices are retracted relative to the first configuration and consequently accelerate the speed of the aircraft automatically to its objective acceleration speed.

Such a method advantageously makes it possible to reduce the workload of the pilot during the take-off phases, enabling him or her to concentrate on monitoring the trajectory and to optimize the runway length and climb slope limits.

Advantageously, the method comprises a step of displaying, on the display screen, the objective position and the real position of the high lift devices.

According to an embodiment of the invention, the control lever is provided with a motor drive and advantageously the control unit is configured to simultaneously bring the high lift devices and the control lever, via the motor drive, to the current aircraft configuration position.

BRIEF DESCRIPTION OF THE DRAWINGS

Other features and advantages of the present invention will become apparent on reading the following description, with reference to the attached figures which represent, respectively.

DETAILED DESCRIPTION OF THE PREFERRED EMBODIMENTS

Figure 1:
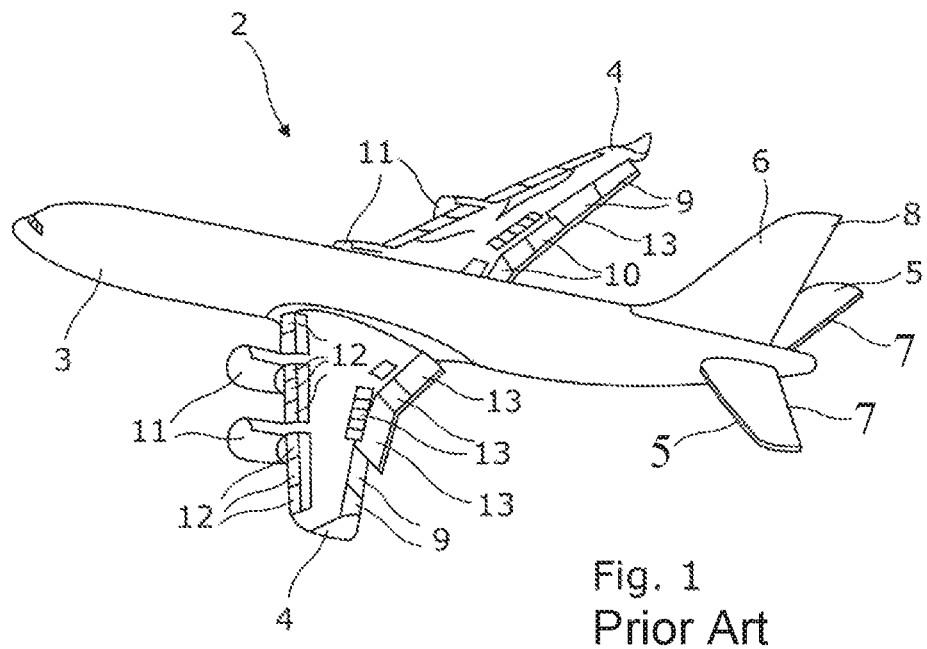
FIG. 1 shows an aircraft equipped with a control system according to the prior art.

FIG. 1 shows an aircraft or airplane 2 conventionally comprising a fuselage 3, to which are connected, among other things, two wings 4 forming the main wing structure, a horizontal rear tail unit formed by two horizontal stabilizers 5 and a vertical stabilizer 6. Each of the horizontal stabilizers 5 is provided with an elevator 7, and the vertical stabilizer 6 is provided with a rudder 8. In addition, each of the wings 4 bears, in particular, usually, ailerons 9, spoilers 10 and propulsion engines 11, for example, four or two engines.

To enhance the performance levels of the airplane 2 on take-off, each of the wings 4 is, in addition, provided with standard high lift devices, namely slats 12 on the leading edge of the wing 4 and flaps 13 on the trailing edge, that can be moved into different positions or configurations making it possible to increase the lift of the aircraft 2.

As described in the patent FR2817535, the aircraft 2 is provided with a system 1 for automatically controlling the high lift devices 12 and 13 during the take-off phase of the aircraft 2.

Figure 2:
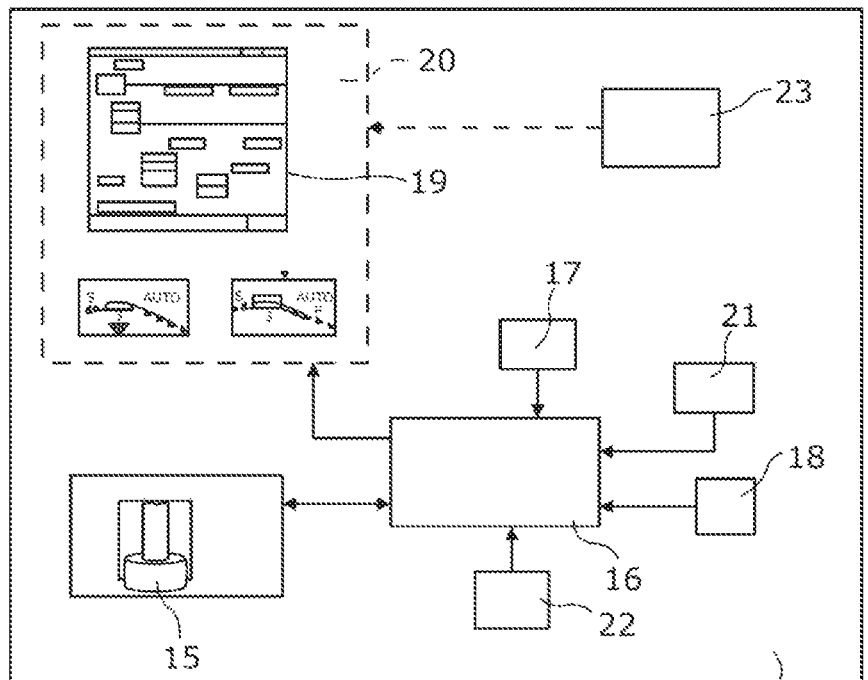
FIG. 2 shows a control system implementing a method according to the invention.

This control system 1, as can be seen in FIG. 2, comprises a standard control lever 15 for moving the high lift devices 12 and 13 into one of the various possible positions or configurations, namely "very high lift" corresponding to a full extension, respectively, of the slats and of the flaps, "average high lift" in which the slats 12 and the flaps 13 are slightly retracted, and a "non high lift" position in which the slats 12 and flaps 13 are, respectively, fully retracted, and a control unit 16, comprising a general purpose or special purpose computer, configured to automatically generate commands for controlling the high lift devices 12 and 13 from a first position corresponding to a deployed configuration at the start of the take-off phase to a second position or configuration corresponding to a retracted position relative to this first position when a sensor 17 transmits a signal indicating "actual take-off" of the aircraft 2 to the control unit 16 as well as the reception of a landing gear retraction signal by a sensor 22 and a confirmation of the actual speed of the aircraft higher than a minimum set point speed of the next configuration available in a list of the available set points.

The control unit 16 is configured to automatically generate a retraction command from a first position or configuration C1 to the second position or configuration C2 when the take-off phase is confirmed by the sensor 17 and when a signal detecting the locking in retracted position of the landing gear is received from the sensor 22 and then that the speed of the aircraft is higher than the minimum speed (VminC2) of the configuration C2 of the high lift devices is confirmed by the unit.

The control unit 16 is configured to compute the minimum speed of the configuration C2 of the high lift devices: VminC2, which is compared to the current speed of the airplane 2 originating from an airplane measurement system 18.

By default, the second configuration C2 after the take-off is the next position in the list of the configurations available for the take-off. For example, the automatic retraction sequences allowed are from a "very high lift" position to an "average high lift" position or from an "average high lift" position to "low high lift" or from a "low high lift" position to "non high lift".

Advantageously, the system 1 comprises a display device 20. This display device 20 represents, in real time, the position of the control lever 15, the objective position of the high lift devices controlled by the unit 16, and the movement and the position of the high lift devices 12 and 13, such that the pilot is fully aware of the set points of the automatic system, of the current position of the slats 12 and flaps 13, and of the position of the control lever 15.

The automatic control system 1 further comprises a human-machine interface 19 and a standard automatic control device 21 linked to the unit 16. The human-machine interface 19 makes it possible to introduce an objective speed V2 before the take-off phase which is higher than the usual speed of the airplane to 35 feet (11 meters) (altitude) and makes it possible to initiate an acceleration to this objective speed V2 also synchronized with the retraction of the landing gear.

This objective speed V2 is determined as a function of the take-off and climb characteristics of the airplane considering a possible failure of an engine, of the characteristics of the runway, of the relief under the airplane trajectory and of the atmospheric conditions encountered at the moment of take-off.

A device for controlling the take-off parameters 23 (as described by the document FR2894045), made available to the pilot, computes all of the optimized take-off parameters, in particular the configuration C1, the configuration C2, the set point rotation speed VR, the increased speed V2 relative to the speed at 35 feet of altitude, according to given runway parameters and for given atmospheric conditions so as to maximize the weight that can take off.

This device for controlling the take-off parameters 23 computes all of the optimized take-off parameters such as, for example, the configuration C1, the configuration C2, the set point rotation speed VR, the increased speed V2 increased relative to the speed at 35 feet so as to respectively reduce the take-off length and increase the slope at the speed V2 after the take-off by considering the failure of an engine.

Thus, the activation of the "automatic control" device 21 armed before the take-off phase allows for an activation triggered from the retraction of the landing gear, thus making it possible to completely automate the acceleration and follow the objective speed V2 in the take-off phase. Thus, the workload of the pilot is further reduced.

Such a capacity to accelerate once the aircraft 2 has left the ground makes it possible to dissociate the take-off speed obtained on passing 35 feet V35 ft from the climb speed V2. Thus, it is possible to minimize the take-off speed, further reducing the take-off length and optimizing the speed used when climbing so as to increase the climb slope.

Figure 3:
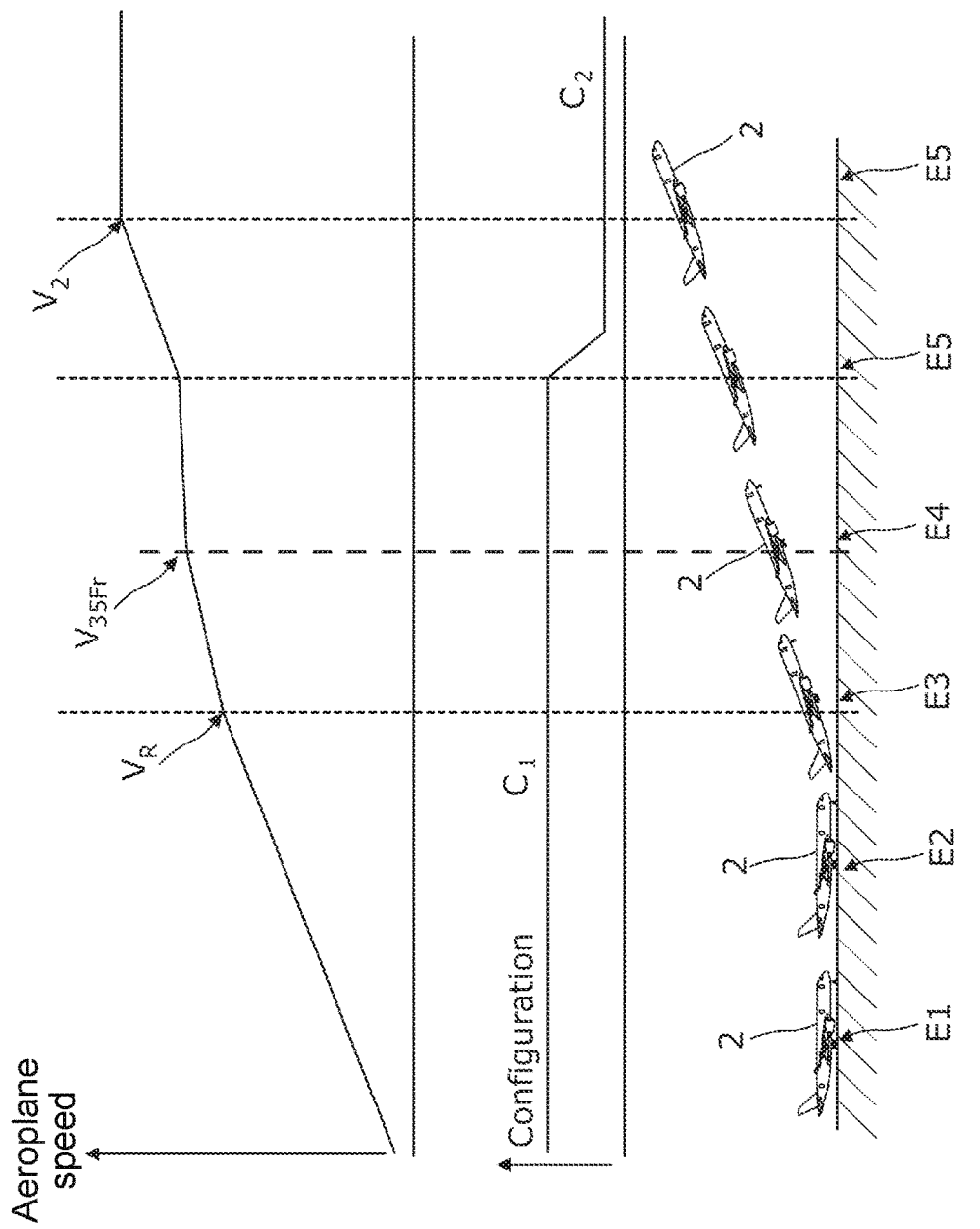
FIG. 3 shows the position of the high lift devices and the speed of the aircraft as a function of the various successive steps of a take-off phase.

Thus, by virtue of the method according to the invention that can be seen in FIG. 3, before the take-off phase, the pilot manually enters the information concerning the first configuration C1 of the high lift devices, and the acceleration speed V2, into the human-machine interface 19.

At the start of the take-off E1, the pilot positions the control lever 15 in the position corresponding to the configuration C1, engages the automatic retraction and "automatic control" device 21;

when the airplane is rolling on the ground E2, the high lift devices 12, 13 are deployed in the configuration C1 determined by the pilot from the device for controlling the take-off parameters 23 so as to increase the lift, thus reducing the take-off speed V35 ft and therefore reducing the runway length; and at the speed VR, in the step E3, the pilot acts on the elevator in order to execute the rotation of the airplane 2. When the actual take-off takes place, step E4, the pilot activates the retraction of the landing gear;

when the gear retraction signal 17 is received, in the step E5 by the unit 16, and the airplane has a speed which is higher than the minimum set point speed of the second configuration C2, the high lift devices 12, 13 are retracted in this configuration C2 so as to reduce the drag and obtain a minimum climb slope (with one engine down); then on reception E5 of the landing gear retraction signal consecutively, the airplane 2 accelerates automatically to its set point speed V2 before stabilizing on this climbing speed V2 in the case of a failure of an engine in the step E6.

The acceleration level is shrewdly controlled by the unit 21 so that the acceleration does not degrade the slope of the trajectory below a limit.

Such an acceleration synchronized with the retraction of the landing gear makes it possible to dissociate the rotation speed VR and the associated 35-foot passage speed V35 ft from the climb speed V2. Thus, it is possible to minimize the rotation speeds VR and V35 ft further reducing the take-off length relative to the control system of the prior art and optimize the speed used when climbing so as to increase the climb slope.

Advantageously, the system 1 makes it possible to manage a speed V2 equal to the speed at 35 feet, which makes it possible to stabilize the climb speed from passage at 35 feet in accordance with the procedure practiced in the prior art. This has the advantage of being able to benefit from the reduced drag of the configuration C2 making it possible to improve the slope from the retraction of the landing gear. This possibility makes it possible to improve the weight that can take off relative to the prior art in the case of limiting obstacles situated in proximity to the runway.

As described above, the control lever 15 of the high lift devices remains practically immobile during the automatic retraction of the high lift devices during the phase of take-off and of acceleration to the objective acceleration speed, then, the airplane 2 being stabilized at this objective speed, the pilot having performed all the airplane control actions and when the airplane has reached a sufficient safe altitude, the pilot manually moves the control lever 15 to the increasingly and successively less high lift positions until the high lift devices are completely retracted.

In a variant embodiment, the control lever 15 is provided with a motor drive (not represented) which is linked to the control unit 16 configured to simultaneously bring the control lever 15 (as mentioned above) and the devices to the controlled configuration position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for optimizing take-off parameters of an aircraft, the aircraft comprising
   high lift devices and an automatic control system for automatically controlling the high lift devices, the automatic control system comprising
      a control lever for moving the high lift devices,
      a control unit for controlling a retraction of the high lift devices,
      a human-machine interface provided with a display screen and an input interface,
      a sensor for detecting an actual take-off of the aircraft, corresponding to a moment when wheels of the aircraft leave the ground,
      a sensor for detecting the retraction of landing gear of the aircraft, and,
      at least one device for measuring a speed of the aircraft,
   the method comprising the steps:
      selecting a first configuration of the high lift devices at the start of the take-off phase,
      selecting an objective acceleration speed of the aircraft on the human-machine interface higher than an 11-meter passage aircraft speed,
      positioning the control lever on the position of the first configuration of the high lift devices at the start of the take-off phase,
      activating the automatic control system,
      receiving, by the control unit, an actual aircraft take-off detection signal, wherein the actual take-off signal comprises receiving, first, a landing gear retraction signal and receiving, second, a confirmation that an actual speed of the aircraft is higher than a minimum set point speed of a second configuration of the high light devices, the second configuration as being the next configuration relative to the first configuration in a list of the set points known by the control unit, and,
      transmitting, by the control, a control command to bring the high lift devices into the second configuration, in which the high lift devices are retracted relative to the first configuration and, then, consecutively, to accelerate the speed of the aircraft automatically to the objective acceleration speed.

2. The method according to claim 1, further comprising the step of displaying, on the display screen, an objective configuration of the high lift devices defined by the unit, a real position of the high lift devices and a position of the control lever.

3. The method according to claim 1, wherein the control lever is provided with a motor drive, wherein the control unit is configured to simultaneously bring the high lift devices and the control lever, via the motor drive, to the current aircraft configuration position.

4. The method according to claim 1, wherein the automatic control system comprises a device for controlling the take-off parameters, wherein the device computes at least one optimized take-off parameter according to given runway parameters and for given atmospheric conditions.

5. The method according to claim 4, wherein the device computes the take-off parameter of the first configuration according to given runway parameters and for given atmospheric conditions.

6. The method according to claim 4, wherein the device computes the take-off parameter of the second configuration according to given runway parameters and for given atmospheric conditions.

7. The method according to claim 4, wherein the device computes the take-off parameter of a set point rotation speed according to given runway parameters and for given atmospheric conditions.

8. The method according to claim 4, wherein the device computes the take-off parameter of the objective speed augmented relative to the 11-meter speed, according to given runway parameters and for given atmospheric conditions.

* * * * *